US007605892B2

(12) United States Patent
Jang et al.

(10) Patent No.: US 7,605,892 B2
(45) Date of Patent: Oct. 20, 2009

(54) LIQUID CRYSTAL DISPLAY DEVICE FOR SWITCHING DISPLAY MODE BETWEEN WIDE VIEWING ANGLE AND NARROW VIEWING ANGLE AND METHOD FOR FABRICATING THE SAME

(75) Inventors: Hyung-Seok Jang, Gyeonggi-Do (KR); Hyun-Suk Jin, Gyeonggi-Do (KR)

(73) Assignee: LG. Display Co., Ltd., Seoul (KR)

( * ) Notice: Subject to any disclaimer, the term of this patent is extended or adjusted under 35 U.S.C. 154(b) by 400 days.

(21) Appl. No.: 11/321,838

(22) Filed: Dec. 29, 2005

(65) Prior Publication Data

US 2007/0002230 A1 Jan. 4, 2007

(30) Foreign Application Priority Data

Jun. 30, 2005 (KR) ..................... 10-2005-0058939

(51) Int. Cl.
*G02F 1/1335* (2006.01)

(52) U.S. Cl. ....................... 349/117; 349/118; 349/110; 349/112; 349/124; 349/129; 349/130; 349/106; 349/107

(58) Field of Classification Search ............ 349/73–83, 349/117–119, 127–129, 133; 359/320, 295, 359/247
See application file for complete search history.

(56) References Cited

U.S. PATENT DOCUMENTS 5,831,698 A * 11/1998 Depp et al. .................. 349/64
5,877,829 A * 3/1999 Okamoto et al. ............. 349/74
5,969,850 A * 10/1999 Harrold et al. ............. 359/320
5,973,817 A * 10/1999 Robinson et al. ........... 359/247
7,016,001 B2 * 3/2006 Tanaka et al. .............. 349/138
7,106,402 B2 * 9/2006 Suzuki et al. .............. 349/113
7,265,893 B2 * 9/2007 Hughes et al. ............. 359/295
2002/0191128 A1 * 12/2002 Okumura et al. ............. 349/96
2005/0286000 A1 * 12/2005 Tsai et al. .................. 349/119
2006/0109396 A1 * 5/2006 Tsai et al. .................... 349/65

* cited by examiner

*Primary Examiner*—Brian M. Healy
*Assistant Examiner*—Guy G Anderson
(74) *Attorney, Agent, or Firm*—Brinks Hofer Gilson & Lione

(57) ABSTRACT

A liquid crystal display (LCD) device for switching a display mode between wide and narrow viewing angle, and a method for fabricating the same, is presented. The LCD device has an LCD panel and a viewing angle control cell. The LCD panel has array and color filter substrates and a liquid crystal layer formed between the substrates. The viewing angle control cell contains a lower substrate that contacts the LCD panel and has a first electrode, an upper substrate having a second electrode, and a ferroelectric liquid crystal layer between the upper and lower substrates. The viewing angle control cell switches the LCD device between wide and narrow viewing angle modes when driven.

6 Claims, 3 Drawing Sheets

LIQUID CRYSTAL DISPLAY DEVICE FOR SWITCHING DISPLAY MODE BETWEEN WIDE VIEWING ANGLE AND NARROW VIEWING ANGLE AND METHOD FOR FABRICATING THE SAME

TECHNICAL FIELD

The present invention relates to a liquid crystal display (LCD) device and a method for fabricating the same, and more particularly, to an LCD device in which a display mode can be selectively switched between a wide viewing angle mode and a narrow viewing angle mode, and a method for fabricating the same.

DESCRIPTION OF THE BACKGROUND ART

Typically, liquid crystal display (LCD) devices are used as flat panel display devices. LCD devices are popular as they have high picture quality and low power consumption.

The LCD device controls optical transmittance by injecting liquid crystal between two substrates and by controlling an intensity of an electric field applied between electrodes on one or both of the substrates. The LCD device is widely used in notebook computers, personal digital assistants (PDA), video telephones, televisions, various portable electronic devices, etc.

In recent years, LCD devices with various characteristics have been developed due to consumer demands. These characteristics include increased screen size, finer pitch, and wide viewing angle.

Various wide viewing angle LCD devices have been developed. One such LCD device uses a horizontal field driving method, while another LCD device includes a compensated film driven by a vertical alignment (VA) method.

The LCD device using a horizontal field driving method has a pixel electrode and a common electrode formed on the same substrate. In this case, an electric field horizontal to the substrate is formed between the pixel electrode and the common electrode when the pixel electrode is turned on. Accordingly, a long axis of liquid crystal molecules is operated in parallel with the substrate according to the on/off state of the pixel electrode. As a result, a refractive index of the liquid crystal observed by the user's naked eyes is small, thereby the LCD device has an excellent contrast ratio and wide viewing angle.

On the other hand, the LCD device using a vertical alignment (VA) method implements a viewing angle by compensation. In this LCD device, a compensation film is attached at an inner side of a polarizing plate. The LCD device using the vertical alignment (VA) method comprises a pair of transparent substrates having a transparent electrode at an inner surface thereof, a liquid crystal material injected between the two substrates and aligned to be perpendicular to the substrate, and a pair of polarizing plates perpendicularly attached to an outer surface of each transparent substrate for polarizing light.

Recently, a LCD device using a different mode has been proposed. In this device, the liquid crystal molecules are divided by forming an opening pattern or a protrusion on a transparent electrode without performing rubbing.

A general LCD device for implementing a viewing angle will be explained with reference to FIG. 1.

FIG. 1 is a sectional view schematically showing a liquid crystal display (LCD) device in accordance with the conventional art.

As shown, a general LCD device comprises a thin film transistor (TFT) array substrate 11, a color filter substrate 41 facing and attached to the TFT array substrate 11 with a uniform gap therebetween, and a liquid crystal layer 51 formed between the TFT array substrate 11 and the color filter substrate 41.

On the TFT array substrate 11, pixels are arranged in a matrix. A thin film transistor 20, a pixel electrode 27, and a capacitor (not shown) are formed at each unit pixel. The thin film transistor 20 comprises a gate electrode 13 formed on the TFT array substrate 11, a gate insulating layer 15 formed on the TFT array substrate 11 including the gate electrode 13, a semiconductor layer 17, and source/drain electrodes 21 and 23 formed on the semiconductor layer 17 and spaced from each other with a certain gap therebetween. The pixel electrode 27 is electrically connected to the drain electrode 23 through a drain contact hole (not shown) formed in a passivation layer 25 formed on an entire surface of the TFT array substrate 11 including the source/drain electrodes 21 and 23.

On the color filter substrate 41, a common electrode 47 for applying an electric field to the liquid crystal layer 51 with the pixel electrode 27, R, G, and B color filters 45 for implementing colors, and a black matrix 43 are formed.

An alignment layer (not shown) is formed at each rear surface of the TFT array substrate 11 and the color filter substrate 41. Also, liquid crystal is arranged on a surface of the alignment layer in a certain direction by rubbing.

The liquid crystal is rotated by dielectric anisotropy when an electric field is applied between the pixel electrode 27 formed at each pixel of the TFT array substrate 11 and the common electrode 47 formed at the front surface of the color filter substrate 41. Accordingly, images are displayed by passing light through each pixel or by preventing light from being transmitted through each pixel.

The color filter substrate 41 and the TFT array substrate 11 are respectively provided with a first polarizing plate 61 and a second polarizing plate 63. The polarizing plates 61 and 63 polarize natural light incident with vibration in several directions into one direction (that is, polarization).

In the LCD device, light from a backlight is emitted to a front surface of an LCD panel, and the light passes through several diffusion sheets (not shown) in order to obtain a uniform brightness. As the light is incident on the front surface of the LCD panel, an image can be displayed in a wide viewing angle.

The general LCD device has a wide viewing angle. However, in specific cases, the LCD device can be fabricated so as to have a narrow viewing angle. Thus, even if an image can be displayed in a wide viewing angle, since light is incident on the front surface of the LCD panel, changing between a narrow viewing angle and a wide viewing angle cannot be actively controlled.

Although not shown, a viewing angle can be narrowed by applying a film-type filter or an optical fiber to the LCD panel. However, a display mode cannot be switched between a wide viewing angle and a narrow viewing angle. Furthermore, using such techniques results in a drastic decrease in the brightness of the front surface of the LCD panel.

SUMMARY

By way of introduction only, in one embodiment a liquid crystal display (LCD) device contains an LCD panel and a viewing angle control cell disposed on the LCD panel. The LCD panel includes an array substrate, a color filter substrate, and a liquid crystal layer formed between the array substrate and the color filter substrate. The viewing angle control cell includes a lower substrate having a first electrode, an upper substrate having a second electrode, and a ferroelectric liquid crystal (FLC) layer between the upper substrate and the lower substrate.

In another embodiment, a liquid crystal display (LCD) device contains an LCD panel and an electronically controllable device disposed on the LCD panel. The LCD panel includes first and second substrates and a liquid crystal layer formed between the first and second substrates. The electronically controllable device is operative to switch the LCD device between a wide viewing angle mode and a narrow viewing angle mode.

In another embodiment, a method for fabricating a liquid crystal display (LCD) device includes: providing an array substrate and a color filter substrate, forming a liquid crystal layer between the array substrate and the color filter substrate to form an LCD panel, and arranging a viewing angle control cell at the LCD panel. The viewing angle control cell has a first electrode at a lower substrate, a second electrode at an upper substrate, and a ferroelectric liquid crystal (FLC) layer between the upper substrate and the lower substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, an LCD device for switching a display mode between a wide viewing angle and a narrow viewing angle according to the present invention will be explained with reference to FIGS. 2 to 4.

Figure 1:
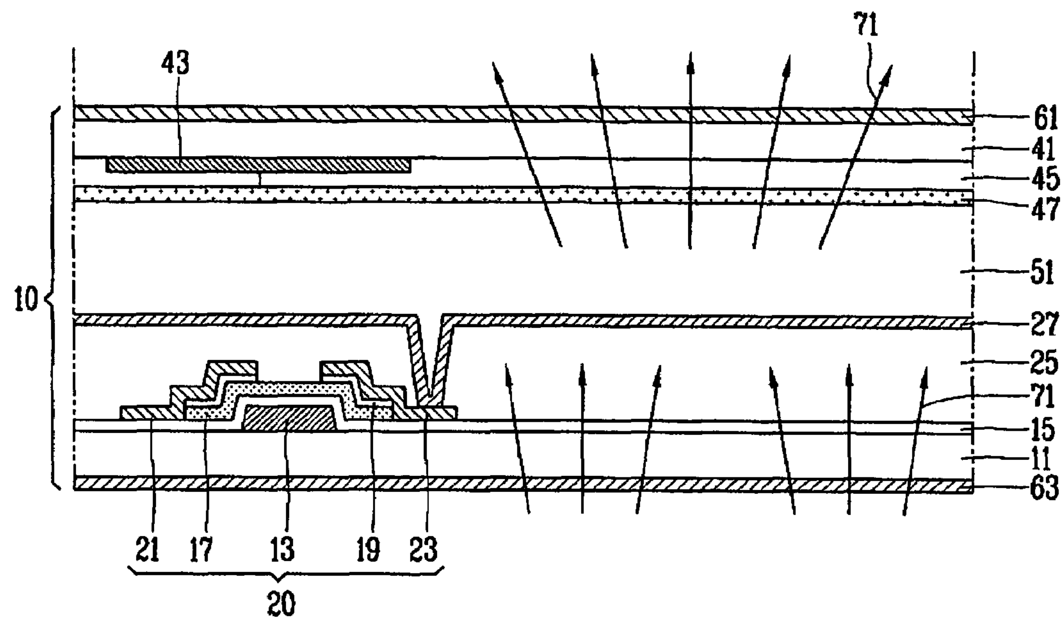
FIG. 1 is a sectional view schematically showing a liquid crystal display (LCD) device in accordance with the conventional art.
Figure 2:
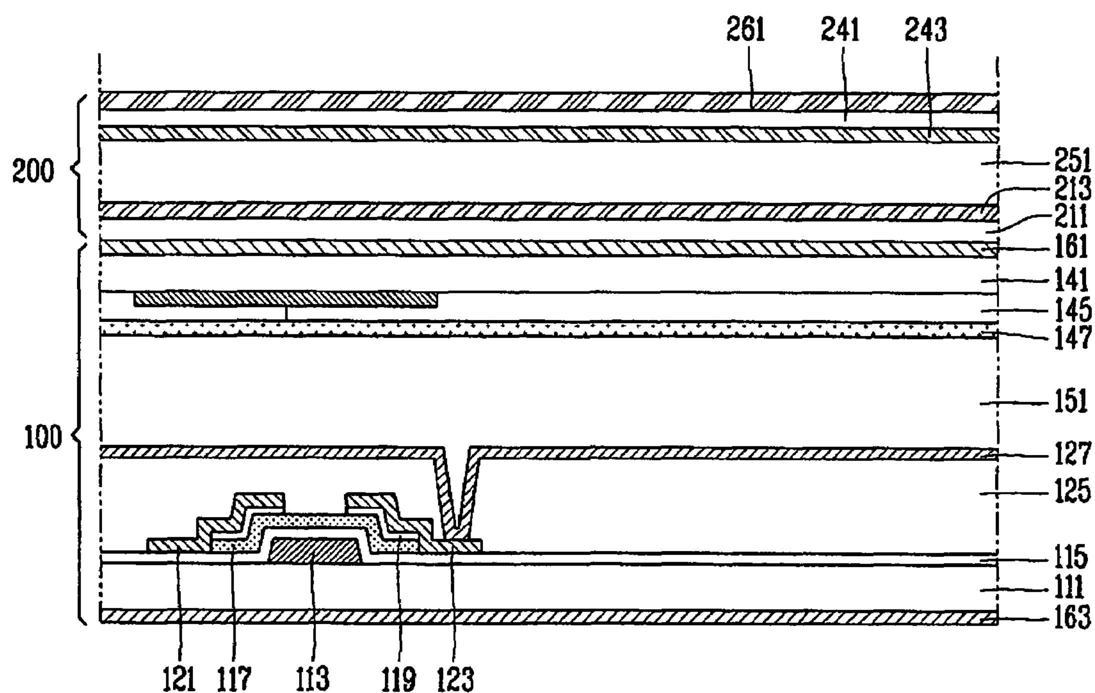
FIG. 2 is a sectional view showing an LCD device for switching a display mode between a wide viewing angle and a narrow viewing angle.
Figure 3A:
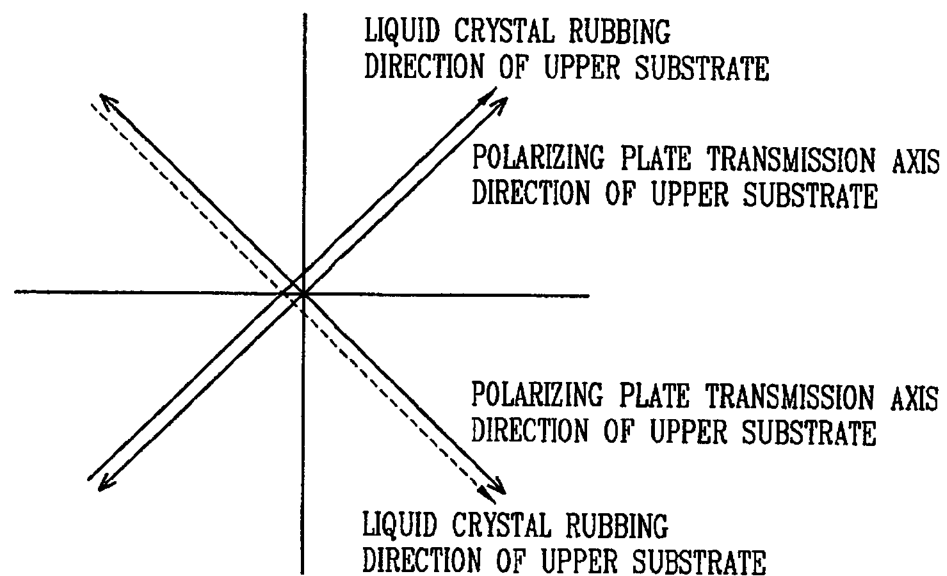
FIG. 3A is a schematic view showing each liquid crystal rubbing direction and each polarizing plate transmission axis direction of an upper substrate and a lower substrate of an LCD panel in the LCD device for switching a display mode between a wide viewing angle and a narrow viewing angle.
Figure 3B:
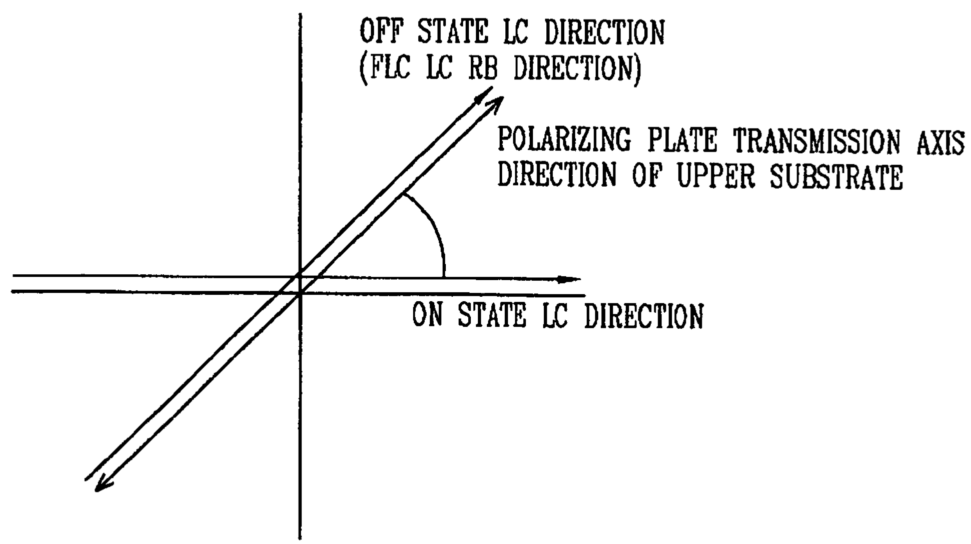
FIG. 3B is a schematic view showing a liquid crystal rubbing direction of a viewing angle control cell and a polarizing plate transmission axis direction in the LCD device for switching a display mode between a wide viewing angle and a narrow viewing angle.
Figure 4:
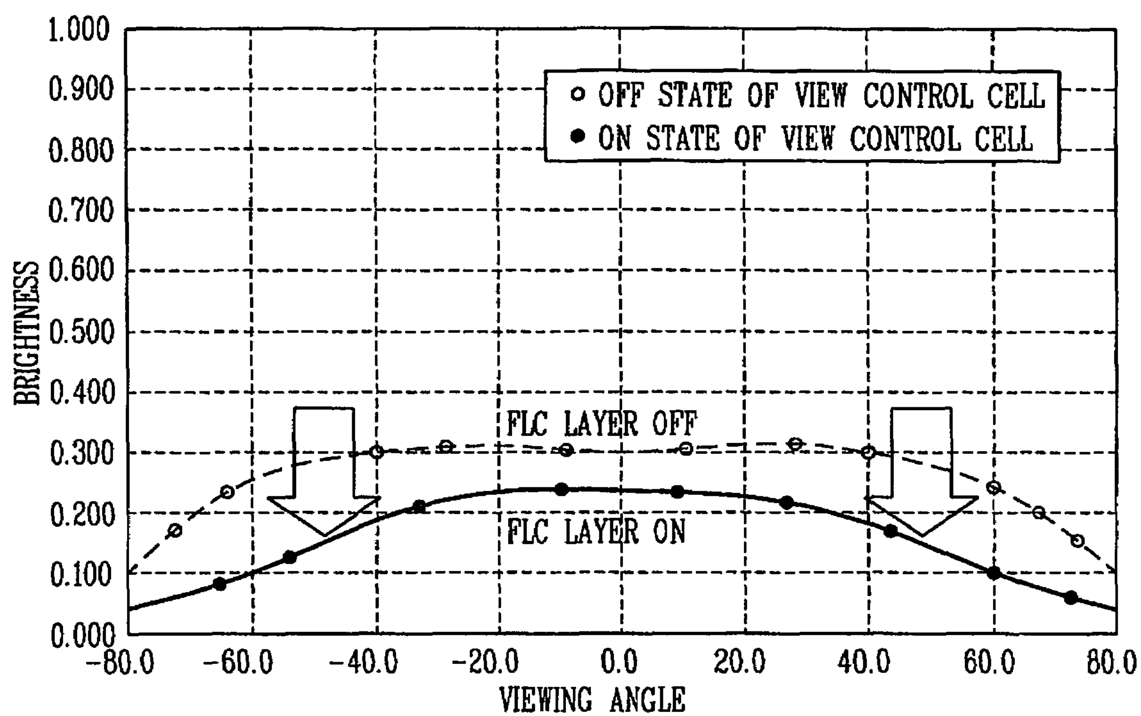
FIG. 4 is a graph showing brightness according to a viewing angle before and after driving a viewing angle control cell in the LCD device for switching a display mode between a wide viewing angle and a narrow viewing angle.

FIG. 2 is a sectional view showing an LCD device for switching a display mode between a wide viewing angle and a narrow viewing angle, FIG. 3A is a schematic view showing each liquid crystal rubbing direction of an upper substrate and a lower substrate of an LCD panel and each polarizing plate transmission axis direction in the LCD device for switching a display mode between a wide viewing angle and a narrow viewing angle, FIG. 3B is a schematic view showing a liquid crystal rubbing direction of a viewing angle control cell and a polarizing plate transmission axis direction in the LCD device for switching a display mode between a wide viewing angle and a narrow viewing angle, and FIG. 4 is a graph showing brightness according to a viewing angle before and after driving a viewing angle control cell in the LCD device for switching a display mode between a wide viewing angle and a narrow viewing angle.

Referring to FIG. 2, the LCD device for switching a display mode between a wide viewing angle and a narrow viewing angle according to the present invention comprises a backlight (not shown), an LCD panel 100 of a wide viewing angle arranged on the backlight, and a viewing angle control cell 200 arranged on the LCD panel 100 for implementing a narrow viewing angle. The viewing angle control cell 200 can be arranged at a lower surface of the LCD panel 100.

The LCD panel 100 has a thin film transistor (TFT) array substrate 111 and a color filter substrate 141 that face each other with a uniform gap therebetween, and a liquid crystal layer 151 formed between the TFT array substrate 111 and the color filter substrate 141.

On the TFT array substrate 111, pixels are arranged as a matrix. A thin film transistor 120, a pixel electrode 127, and a capacitor (not shown) are formed at each unit pixel. The thin film transistor 120 comprises a gate electrode 113 formed on the TFT array substrate 111, a gate insulating layer 115 formed on the TFT array substrate 111 including the gate electrode 113, a semiconductor layer 117, and source/drain electrodes 121 and 123 formed on the semiconductor layer 117 and spaced from each other with a certain gap therebetween. The pixel electrode 127 is electrically connected to the drain electrode 123 through a drain contact hole formed in a passivation layer 125 formed on an entire surface of the TFT array substrate 111 including the source/drain electrodes 121 and 123.

On the color filter substrate 141, a common electrode 147 for applying an electric field to the liquid crystal layer 151 with the pixel electrode 127, R, G, and B color filters 145 for implementing colors, and a black matrix 143 are formed.

An alignment layer (not shown) is formed at each rear surface of the TFT array substrate 111 and the color filter substrate 141. Also, liquid crystal is arranged on a surface of the alignment layer in a certain direction by rubbing. The liquid crystal is rotated by dielectric anisotropy when an electric field is applied between the pixel electrode 127 formed at each pixel of the TFT array substrate 111 and the common electrode 147 formed at the front surface of the color filter substrate 141. Accordingly, images are displayed by passing light through each pixel or by preventing light from being transmitted through each pixel.

The color filter substrate 141 and the TFT array substrate 111 are respectively provided with a first polarizing plate 161 and a second polarizing plate 163 at facing surfaces thereof. The polarizing plates 161 and 163 polarize incident light with vibration in several directions into one direction (that is, polarization).

The viewing angle control cell 200 comprises a lower substrate 211, a first electrode 213 formed on the lower substrate 211, an upper substrate 241 spaced from the lower substrate 211 with a certain gap therebetween, a second electrode 243 formed on the upper substrate 241, and an FLC (ferroelectric liquid crystal) layer 251 formed between the lower substrate 211 and the upper substrate 241. The FLC layer 251 has a bi-stable characteristic, that is, the FLC layer 251 has two modes in which the liquid crystal molecules are twisted or are not twisted. A third polarizer 261 is formed at a rear surface of the upper substrate 241.

In the LCD device for switching a display mode between a wide viewing angle and a narrow viewing angle, an operation of the viewing angle control cell will be explained.

Referring to FIG. 3A, a liquid crystal rubbing direction of the lower substrate and a direction of a transmission axis of the first polarizing plate 161 of the lower substrate are same. Also, a liquid crystal rubbing direction of the upper substrate and a direction of a transmission axis of the second polarizing plate 163 of the upper substrate are same.

Referring to FIG. 3B, when the viewing angle control cell 200 is not driven, a rubbing direction of the FLC layer 251 is equal to a direction of a transmission axis of the first polarizing plate 161. Accordingly, light passing through the TN liquid crystal panel passes through the viewing angle control cell 200. Also, light emitted from an inclined direction of the viewing angle control cell does not substantially influence the LCD panel.

On the other hand, when an electric field is applied to the viewing angle control cell 200, the liquid crystal of the FLC layer 251 is altered. The polarization of light passing through the FLC 251 rotates by an angle of 45° relative to the transmission axis of the polarizing plate as shown in FIG. 3B. A phase delay difference (Δnd) of the FLC layer 251 is in a range of 3λ/4~λA.

If the And of the FLC layer 251 is λ/2, which is the same as that of a general LCD device, light passing through the TN panel is changed into a perpendicular polarization via the FLC layer 251. Accordingly, the brightness of a front surface of the LCD panel is approximately 0, so that the LCD panel does not serve as a display device.

Also, if the Δnd of the FLC layer 251 is λ, a brightness change at the front surface of the LCD panel is very small when the viewing angle control cell is turned on. Accordingly, the brightness at the front surface of the LCD panel is not decreased. However, the brightness of the LCD panel at an inclined angle is not decreased either. Therefore, a viewing angle cannot be properly controlled.

Referring to FIG. 4, the overall brightness of the front surface of the LCD panel is decreased as the viewing angle control cell is turned on. However, the brightness of the viewing angle control cell at larger viewing angles is decreased to a greater extent than at smaller viewing angles. Furthermore, a contrast decrease in images displayed at the front surface of the LCD panel is small as the FLC layer is thin, and thus a viewing angle of the LCD panel can be properly controlled. A viewing angle of 0° is perpendicular to a surface of the LCD device.

As aforementioned, in the LCD device for switching a display mode between a wide viewing angle and a narrow viewing angle, a viewing angle control cell is arranged at an upper surface or a lower surface of the LCD panel. The viewing angle control cell contains an FLC layer having upper/lower electrodes and a bi-stable characteristic. Accordingly, the brightness of the LCD panel at the front surface having an inclination angle can be effectively controlled. That is, a wide viewing angle and a narrow viewing angle can be controlled by narrowing a viewing angle without having a large loss of the brightness at the front surface of the LCD panel.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A liquid crystal display (LCD) device for switching a display mode between a wide viewing angle and a narrow viewing angle, comprising:

an LCD panel including an array substrate, a color filter substrate, and a liquid crystal layer formed between the array substrate and the color filter substrate; and a viewing angle control cell including a lower substrate contacting the LCD panel and having a first electrode, an upper substrate contacting the LCD panel and having a second electrode, and a ferroelectric liquid crystal (FLC) layer formed between the upper substrate and the lower substrate, wherein the ferroelectric liquid crystal (FLC) layer has a bi-stable characteristic, and a phase delay difference of the FLC layer is in a range of 3λ/4 to λ.

2. The device of claim 1, wherein a thin film transistor and a pixel electrode are formed on the array substrate.

3. The device of claim 1, wherein the array substrate, the color filter substrate, and the viewing angle control cell are provided with a polarizing plate at each rear surface thereof.

4. The device of claim 1, wherein when the viewing angle control cell is driven, a narrow viewing angle mode is formed.

5. The device of claim 1, wherein the lower substrate of the viewing angle control cell contacts the LCD panel.

6. A liquid crystal display (LCD) device comprising:

an LCD panel including an array substrate, a color filter substrate, and a liquid crystal layer formed between the array substrate and the color filter substrate, wherein a thin film transistor and a pixel electrode are formed on the array substrate; and a viewing angle control cell disposed on the LCD panel, the viewing angle control cell including a lower substrate having a first electrode, an upper substrate having a second electrode, and a ferroelectric liquid crystal (FLC) layer between the upper substrate and the lower substrate, wherein the ferroelectric liquid crystal (FLC) layer has a bi-stable characteristic, and a phase delay difference of the FLC layer is in a range of 3λ/4 to λ, wherein the array substrate, the color filter substrate, and the viewing angle control cell are each provided with a polarizing plate; and the viewing angle control cell is operative to switch the LCD device between a wide viewing angle mode when the viewing angle control cell is not driven and a narrow viewing angle mode when the viewing angle control cell is driven.

* * * * *

UNITED STATES PATENT AND TRADEMARK OFFICE

CERTIFICATE OF CORRECTION

PATENT NO. : 7,605,892 B2
APPLICATION NO. : 11/321838
DATED : October 20, 2009
INVENTOR(S) : Jang et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 400 days Delete the phrase "by 400 days" and insert -- by 516 days --

Signed and Sealed this

Twentieth Day of April, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,605,892 B2
APPLICATION NO. : 11/321838
DATED : October 20, 2009
INVENTOR(S) : Jang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Fifth Day of October, 2010

David J. Kappos

*Director of the United States Patent and Trademark Office*